United States Patent
Young et al.

(10) Patent No.: US 10,131,313 B2
(45) Date of Patent: Nov. 20, 2018

(54) INFLATABLE CURTAIN RESTRICTOR

(71) Applicant: TRW Vehicle Safety Systems Inc., Washington, MI (US)

(72) Inventors: Kim S. Young, Rochester Hills, MI (US); Kurt F. Fischer, Leonard, MI (US); Rico S. Bertossi, Kenockee, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 14/868,684

(22) Filed: Sep. 29, 2015

(65) Prior Publication Data

US 2016/0280177 A1  Sep. 29, 2016

Related U.S. Application Data

(60) Provisional application No. 62/137,261, filed on Mar. 24, 2015.

(51) Int. Cl.
| | |
|---|---|
| *B60R 21/232* | (2011.01) |
| *B60R 21/201* | (2011.01) |
| *B60R 21/2334* | (2011.01) |
| *B60R 21/2342* | (2011.01) |
| *B60R 21/231* | (2011.01) |
| *B60R 21/2165* | (2011.01) |
| *B60R 21/213* | (2011.01) |
| *B60R 21/235* | (2006.01) |
| *B60R 21/16* | (2006.01) |

(52) U.S. Cl.
CPC .......... *B60R 21/232* (2013.01); *B60R 21/201* (2013.01); *B60R 21/2165* (2013.01); *B60R 21/2334* (2013.01); *B60R 21/2342* (2013.01); *B60R 21/23138* (2013.01); *B60R 21/213* (2013.01); *B60R 21/235* (2013.01); *B60R 2021/161* (2013.01)

(58) Field of Classification Search
CPC . B60R 21/232; B60R 21/2165; B60R 21/201; B60R 21/23138; B60R 21/213; B60R 21/2334; B60R 21/215; B60R 21/2176; B60R 21/2342; B60R 2021/161; B60R 2021/0006
USPC ................................ 280/730.2, 728.2, 730.1
See application file for complete search history.

(56) References Cited

U.S. PATENT DOCUMENTS

| | | | |
|---|---|---|---|
| 5,957,487 A | 9/1999 | Stutz | |
| 7,731,224 B2 * | 6/2010 | Enriquez | ............... B60R 21/201 280/730.2 |
| 7,731,230 B2 | 6/2010 | Fischer et al. | |

(Continued)

*Primary Examiner* — Keith J Frisby
(74) *Attorney, Agent, or Firm* — Tarolli, Sundheim, Covell & Tummino LLP

(57) ABSTRACT

An apparatus (10) for helping to protect an occupant (28) of a vehicle (12) includes an inflatable vehicle occupant protection device (14) configured to be inflated and deployed between a side structure (16) of the vehicle and the vehicle occupant. A deployment sleeve (50) encircles a portion of the protection device. The deployment sleeve (50) includes a rupturable tear seam (54) that absorbs the initial break-out forces of the protection device (14) during the initial stages of inflation and deployment. The tear seam (54) is adapted to rupture after the deployment sleeve (50) absorbs the break-out forces and release the protection device (14) to inflate and deploy to a fully inflated and deployed condition.

22 Claims, 6 Drawing Sheets

(56) References Cited

U.S. PATENT DOCUMENTS

| | | | |
|---|---|---|---|
| 2008/0258442 A1* | 10/2008 | Quach | B60R 21/201 280/730.2 |
| 2014/0265270 A1* | 9/2014 | Wang | B60R 21/237 280/730.2 |
| 2015/0191141 A1* | 7/2015 | Wang | B60R 21/232 280/730.2 |

* cited by examiner

INFLATABLE CURTAIN RESTRICTOR

RELATED APPLICATION

The application claims the benefit of U.S. Provisional Application Ser. No. 62/137,261, filed on Mar. 24, 2015, the subject matter of which is hereby incorporated by reference in its entirety.

TECHNICAL FIELD

The invention relates to an inflatable vehicle occupant protection device for helping to protect an occupant of a vehicle.

It is known to inflate an inflatable vehicle occupant protection device to help protect a vehicle occupant upon the occurrence of an event for which occupant protection is desired, such as a vehicle collision or rollover. One particular type of inflatable vehicle occupant protection device is an inflatable curtain. Inflatable curtains are inflatable from a stored condition away from a vehicle roof to a deployed position between a side structure of the vehicle and a vehicle occupant.

It is known to provide an inflatable vehicle occupant protection device, such as an air bag, for helping to protect an occupant of a vehicle. Air bags are deployable in response to the occurrence of an event for which occupant protection is desired, such as an impact to the vehicle, a vehicle rollover, or a combination thereof. One particular type of air bag is an inflatable curtain or curtain air bag ("CAB") that is inflatable away from the roof of the vehicle between a vehicle occupant and the side structure of the vehicle. A known curtain air bag is inflated from a deflated and stowed condition extending along the vehicle roof rail, at or near the intersection of the side structure of the vehicle and the vehicle roof. The curtain air bag is concealed by the vehicle headliner and trim pieces.

Another type of air bag is a seat mounted side air bag. Seat mounted side air bags can be mounted to the seat frame, either on the seat base or the seat back. When inflated and deployed, the side air bag is positioned between the side structure of the vehicle and the occupant of the seat. The seat mounted side air bag is concealed within the seat by seat padding and upholstery/cover materials.

Upon sensing the occurrence of an event for which inflation of the air bag is desired, such as a vehicle collision, a sensor provides a signal to the inflator. Upon receiving the signal from the sensor, the inflator is actuated and provides inflation fluid to the air bag in a known manner. The inflating air bag exerts a force that ruptures, tears, displaces, or otherwise opens the concealing structure (e.g., headliner, trim pieces, padding, upholstery), and the air bag inflates toward a fully inflated and deployed condition The air bag, while in this inflated and deployed condition, helps protect the vehicle occupant from impacts, such as with parts of the vehicle.

In development and testing of vehicle safety systems, manufacturers and safety authorities rely on statistical models and data to help quantify performance criteria and measure system performance. In doing so, reference is made to statistical vehicle occupants that represent the physical characteristics of vehicle occupants for which vehicle safety systems are meant to protect. Two of these statistical occupants are a $50^{th}$ percentile mate occupant (50% male) and a $5^{th}$ percentile female occupant (5% female). The 50% male is derived from statistical values for the U.S. male population. The 50% mate has the mean height and weight of the male U.S. population, meaning that roughly half of the U.S. male population is taller/heavier and roughly half of the U.S. male population is shorter/lighter. The 50% male is thus an average or medium sized male occupant. The 5% female is derived from statistical values for the U.S. female population. The 5% female has a mean height and weight that, is taller/heavier than only roughly 5% of the U.S. female population. Conversely, this means that roughly 95% U.S. female population is taller/heavier than the 5% female. The 5% female is thus a small female occupant.

One scenario for which manufacturers of vehicle safety systems can design those systems to account for is referred to as an out-of-position (OOP) occupant. OOP performance of a vehicle safety system refers to how that system responds to an occupant being positioned away from the normally seated position at the time of deployment. In regard to vehicle air bags, OOP performance refers to the performance of the air bag when the occupant is positioned away from the normally seated position at the time of air bag deployment OOP performance can be important because an OOP occupant may be positioned closer (i.e., closer than a normally seated occupant) to the area of the vehicle from which the air bag deploys.

Vehicle occupants can have a variety of OOP positions. For example, an OOP occupant could be leaned forward at the time of deployment, which may be the case, for example, when the occupant is retrieving an item (purse, etc.) from the vehicle foot well. As another example, an occupant could be leaning against the side of the vehicle, which may be the case where the occupant is sleeping. As a further example, an occupant could be turned sideways and have his or her back positioned against the side structure of the vehicle, which may be the case, for example, where the occupant is turned to face and converse with others in the vehicle.

SUMMARY OF THE INVENTION

The invention relates to a structure for inhibiting deployment of an inflatable vehicle occupant protection device under certain circumstances involving the presence of an OOP occupant. The invention includes a deployment sleeve in the form of a rupturable fabric loop that helps to absorb the break-out forces associated with the initial inflation and deployment of the air bag. The rupturable deployment sleeve encircles at least a portion of the air bag. For example, in one embodiment, the loop encircles a curtain air bag along a portion of its length that coincides with locations where an occupant's head may be located.

The invention also relates to an apparatus for helping to protect an occupant of a vehicle includes an inflatable vehicle occupant protection device configured to be inflated and deployed between a side structure of the vehicle and the vehicle occupant. A deployment sleeve encircles a portion of the protection device. The deployment sleeve includes a rupturable tear seam that absorbs the initial break-out forces of the protection device during the initial stages of inflation and deployment. The tear seam is adapted to rupture after the deployment sleeve absorbs the break-out forces and release the protection device to inflate and deploy to a fully inflated and deployed condition.

According to one aspect, the deployment sleeve is configured and arranged to extend along and cover an axial portion of the protection device that coincides with the likely position of the occupant's head.

According to one aspect, the deployment sleeve is configured and arranged to leave axial portions of the protection device that do not coincide with the likely position of the occupant's head free to inflate and deploy without restriction.

According to one aspect, the axial portions of the protection device not covered by the deployment sleeve are permitted to inflate and deploy ahead of the portions covered by the deployment sleeve.

According to one aspect, the deployment sleeve is constructed and arranged so that the tear seam is maintained for a duration sufficient to absorb break-out forces and thereby help protect an out of position vehicle occupant and also to rupture in time to permit the inflatable curtain to reach the fully inflated and deployed condition in time to help protect a normally positioned vehicle occupant.

According to one aspect, the apparatus includes an inflator and a fill tube having a portion disposed inside the protection device to deliver inflation fluid from the inflator to the protection device. The inflated, fill tube, protection device, and deployment sleeve are assembled as a module that is configured for installation in the vehicle as a unit.

According to other aspects, the protection device can be a roof rail mounted curtain air bag. The protection device can also be a seat mounted side protection device. The deployment sleeve can include a fabric panel that is folded over and has overlying portions interconnected to form a loop. The tear seam can include one or more perforations in the fabric panel.

BRIEF DESCRIPTION OF THE DRAWINGS

The foregoing and other features of the invention will become apparent to those skilled in the art to which the invention relates upon reading the following description with reference to the accompanying drawings, in which.

DESCRIPTION OF EMBODIMENTS

Figure 1A:
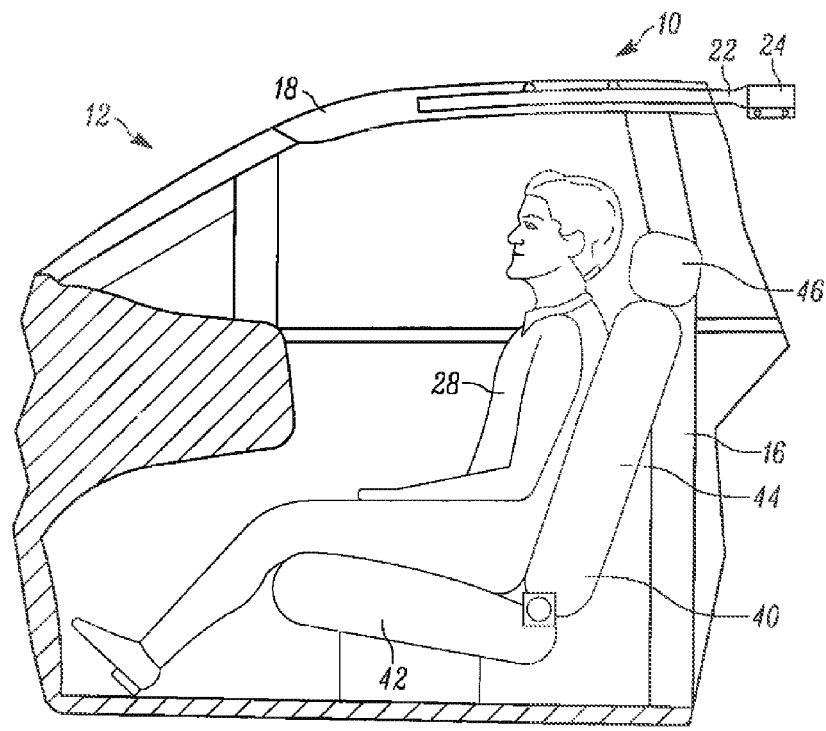
FIGS. 1A-1C are schematic views illustrating different conditions of an apparatus for helping to protect an occupant of a vehicle, according to the invention.
Figure 1B:
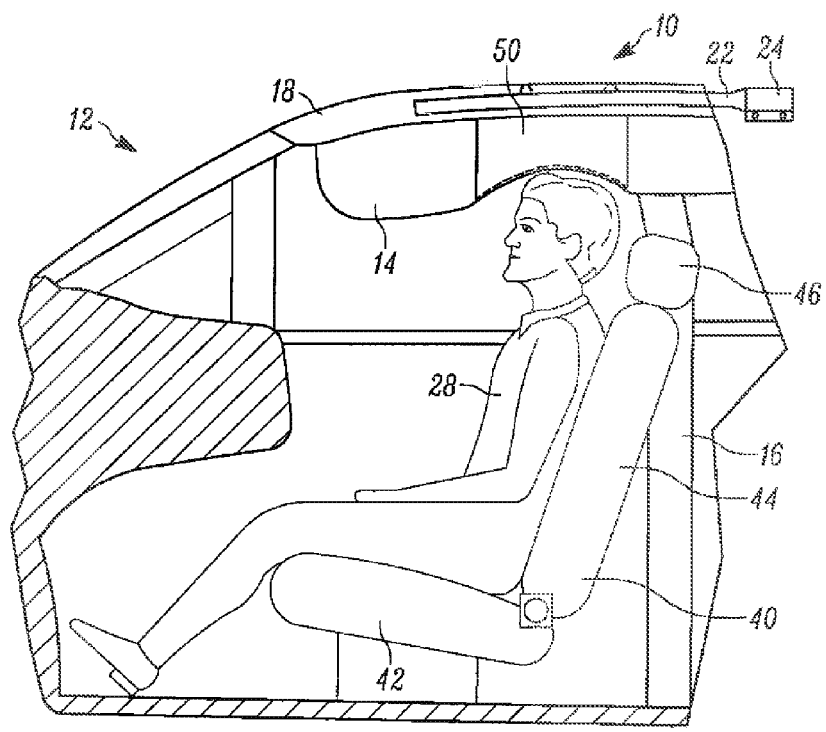
Figure 1C:
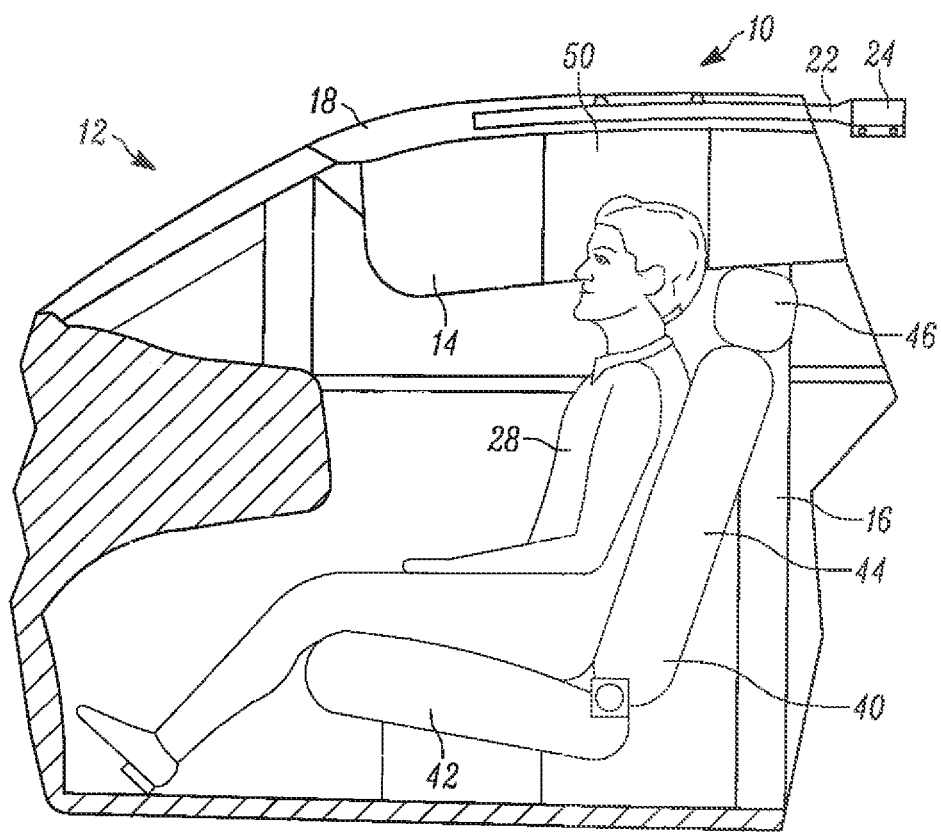

Representative of the invention, FIGS. 1A-1C illustrate an apparatus 10 for helping to protect an occupant 28 of a vehicle 12. The apparatus 10 includes an inflatable vehicle occupant protection device in the form of an inflatable curtain 14 (see FIGS. 1B and 1C). The inflatable curtain 14 has a stored condition, shown in FIG. 1A, in which the deflated curtain is rolled, folded, or rolled and folded, and positioned adjacent the intersection of a side structure 16 and a roof 18 of the vehicle 12. The inflatable curtain 14 is inflatable from the stored position in a direction away from the roof 18 to a deployed position shown in FIG. 1C. In the deployed position, the inflated curtain 14 extends along the side structure 16 and is positioned between the side structure and any occupants 28 of the vehicle 12.

Figure 5:
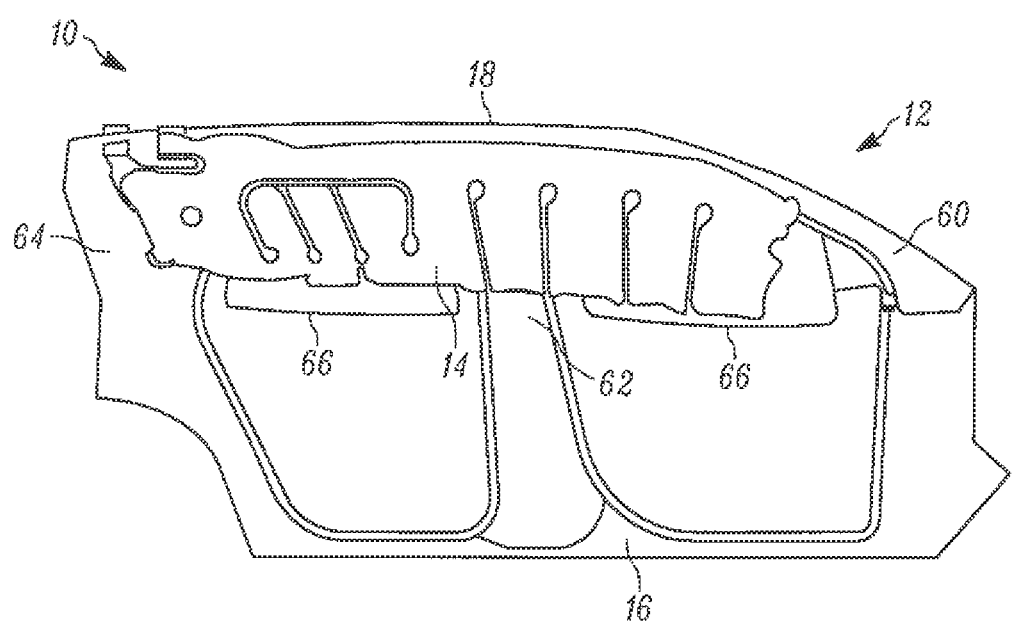
FIG. 5 is a plan view illustrating one particular configuration of an apparatus that can be implemented by the invention.

The inflatable curtain 14 illustrated in FIGS. 1A-1C is representative of a virtually limitless variety of inflatable curtain configurations that the apparatus 10 can include. For reference, and by way of example, FIG. 5 shows a more detailed illustration of an inflatable curtain 14 that the apparatus 10 can include. In FIG. 5, the inflatable curtain 14 extends along a vehicle side structure 16, from an A-pillar 60 to a C-pillar 64 and covers a B-pillar 62. The inflatable curtain 14 of FIG. 5 can thus help protect both front and rear seat occupants (not shown) of the vehicle 12. The curtain 14 extends from the vehicle roof 16 down to adjacent or near a belt line 66 of the vehicle 12.

The inflatable curtain 14 and vehicle 12 illustrated in FIG. 5 are but one of a vast number of possible example vehicle/curtain configurations. The extent and coverage of the inflatable curtain 14 can vary depending on different vehicle configurations. For example, in a vehicle including A, B, C, and D pillars, the curtain could extend from and cover all or portions of the A-D pillars. Additionally, the vertical extent of the inflatable curtain 14 can be from adjacent or near the roof 16, terminating above, at, or below the belt line 66.

The inflatable curtain 14 can be formed fern any suitable material. For example, the inflatable curtain 14 may be formed from a fabric woven with nylon yarns (e.g., nylon 6-6 yarns). Also, the inflatable curtain 14 may have any suitable construction. For example, the inflatable curtain 14 may have a one piece woven (OPW) construction in which the curtain is woven as a single piece of material. As another example, the inflatable curtain 14 may be constructed by interconnecting fabric panels via means, such as stitching, ultrasonic welding, heat bonding, or adhesives.

The inflatable curtain 14 may be uncoated, coated with a material, such as a gas impermeable urethane, or laminated with a material, such as a gas impermeable film. The inflatable curtain 14 thus may have a gas-tight or substantially gas-tight construction. Those skilled in the art will appreciate that alternative materials, such as polyester yarn, and alternatives coatings, such as silicone, may also be used to construct the inflatable curtain 14.

The apparatus 10 also includes an inflation fluid source in the form of an inflator 24. The inflator 24 is actuatable to provide inflation fluid for inflating the inflatable curtain 14. The inflator 24 may be of any suitable construction or configuration. For example, the inflator 24 may contain a stored quantify of pressurized inflation fluid (not shown) in the form of a gas for inflating the inflatable curtain 14. As another example, the inflator 24 could contain a combination of pressurized inflation fluid and ignitable material for heating the inflation fluid, or could be a pyrotechnic inflator that uses the combustion of gas-generating material to generate inflation fluid. As a further example, the inflator 24 could be of any suitable type or construction for supplying a medium for providing inflation fluid for inflating the inflatable curtain 14.

In the embodiment illustrated in FIG. 1, the inflator 24 is connected in fluid communication with the inflatable curtain 14 through a conduit or fill tube 22. The fill tube 22 may be constructed of any suitable material, such as metal, plastic, or fabric. Alternatively, the fill tube 22 may be omitted and inflation fluid could be discharged into the inflatable curtain 14 from the inflator 24 directly or through a manifold.

The fill tube 22 may also have any suitable configuration. For example, the fill tube 22 may extend substantially along the entire length of the inflatable curtain 14, as shown in FIGS. 1 and 2. Alternatively, the fill tube 22 may extend along any portion of the length of the inflatable curtain 14. The portion of the fill tube 22 positioned in the inflatable curtain 14 includes a plurality of openings (not shown) through which inflation fluid is delivered to the curtain.

The apparatus 10 can include a cover (not shown) that helps support the inflatable curtain 14 in the stored condition. The cover may have various constructions. For example, the cover may have what is referred to as a "soft pack" construction, in a soft pack construction, the cover may comprise a sheet or panel of material, such as fabric, that is wrapped or otherwise placed around the inflatable curtain, in one particular soft pack construction, the cover is configured as a sock, sheath, or tube into which the inflatable curtain 14 and fill tube 22 are placed.

The fabric material used to construct the cover may be a woven material, such as nylon or polyester, a non-woven material, such as a plastic film, or any other suitable material. The cover may be constructed by interconnecting portions of the fabric material using known means, such as an adhesive, stitching, ultrasonic welding, heat bonding, or weaving the cover with an OPW construction. In one particular soft pack construction, the cover may be formed by interconnecting portions of the fabric material via ultrasonic welding. This gives the cover a generally tubular sock or sheath-like configuration.

The apparatus 10 may be assembled for installation in the vehicle 12 as a unit. For example, the apparatus 10 may form a portion of an inflatable curtain module that includes the inflator 24 connected to the fill tube 22, which is positioned in the rolled or folded inflatable curtain 14 and packaged in the cover. The inflatable curtain module can be supported in the vehicle 12 by means, such as hooks or brackets, that connect the inflatable curtain 14, inflator 24, fill tube 22, cover, or any combination thereof, to the vehicle 12. For example, brackets may encircle and clamp onto the fill tube 22 and portions of an upper edge portion of the inflatable curtain 14 and extend through the openings in the cover to allow for connecting the brackets to the vehicle.

Upon sensing the occurrence of an event for which inflation of the inflatable curtain 14 is desired, a sensor (not shown) provides an actuation signal to the inflator 24 via lead wires. Upon actuation of the inflator 24, inflation fluid is directed through the fill tube 22 into the inflatable curtain 14. The inflating curtain 14 ruptures the cover, for example, along a tear seam. The inflatable curtain 14 inflates and deploys under the pressure of inflation fluid provided by the inflator 24 from the stored position of FIG. 1A through the intermediate position of FIG. 1B to the deployed position of FIG. 1C.

In the deployed position, the inflatable curtain 14 is positioned between the side structure 16 and any occupants 28 of the vehicle 12. The inflatable curtain 14, when inflated, extends fore and aft in the vehicle 12 along the side structure 16 and may cover portions of an A pillar, B pillar and a C pillar of the vehicle. The inflatable curtain 14 can, for example extend from the intersection of the side structure 16 and the vehicle roof 18 down to adjacent or near a vehicle belt line. The inflatable curtain 14 helps absorb impacts with the curtain and helps distribute the energy of impacts throughout a large area of the curtain.

Figure 3A:
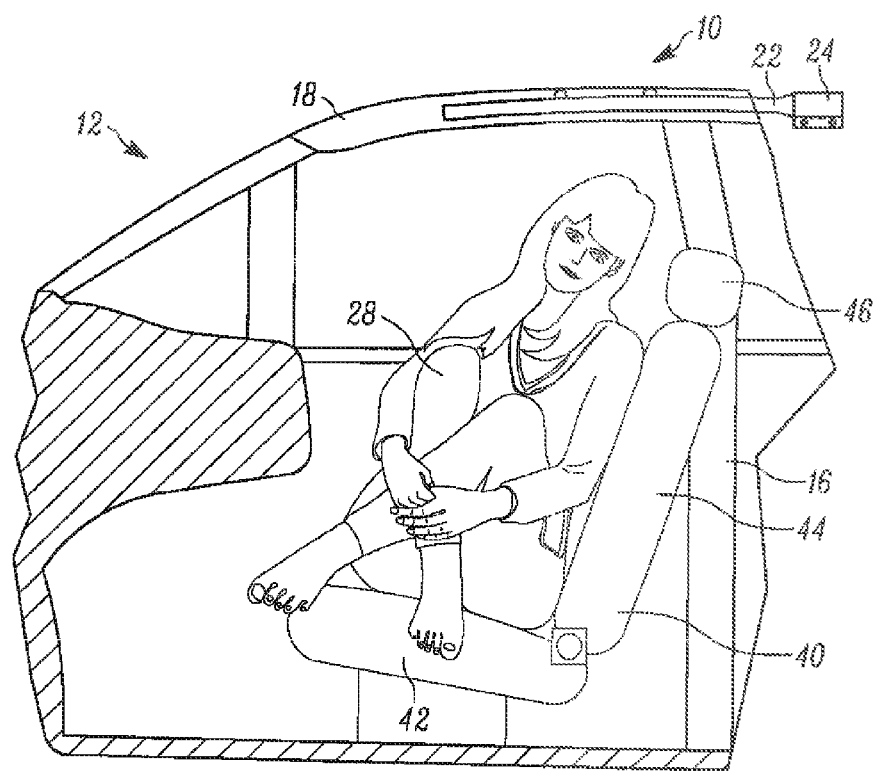
FIGS. 3A and 3B are schematic views illustrating an occupant in a particular position in a vehicle.
Figure 3B:
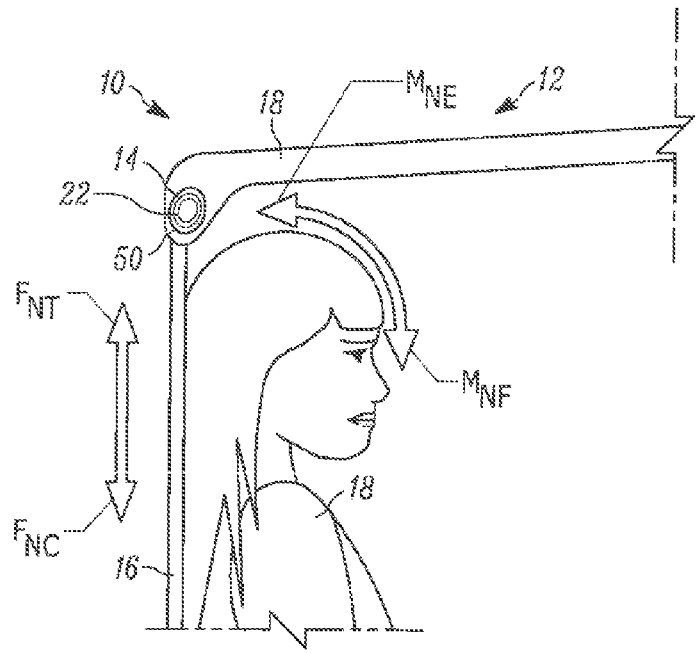

In FIGS. 1A-1C, the occupant 28 is seated in what is referred to herein as a "normal" or "normally" seated position. By this, it is meant that the occupant 28 is seated on the seat 40 with his or her buttocks on the seat platform 42, facing forward, with his or her back resting against or near the seat backrest 44 and head adjacent or near the headrest 46. Referring to FIGS. 3A and 3B, an occupant 28 is seated away from the normal seating position, which is referred to herein and in the art as an out of position ("OOP") occupant. The OOP occupant 28 of FIGS. 3A and 3B is positioned with legs crossed and pulled up onto the seat platform 42, facing laterally toward the center of the vehicle with her back resting against the vehicle doer. This could be the case, for example, if the occupant 28 was in a resting or sleeping position or turned to converse with other passengers in the vehicle 12.

The occupant 28 in the position of FIGS. 3A and 3B is susceptible to having the inflatable curtain 14 engage her head during deployment. In evaluating the potential for injury due to this condition, reference can be made to Neck Injury Criteria ("NIC"). Neck injury criteria involves evaluating forces and moments that can act on the passenger's neck during an impact event. The forces are categorized as tension-compression forces. The moments are categorized as flexion-extension moments.

Referring to FIG. 3B, the forces and moments that can act on the occupant's neck are illustrated by arrows that indicate the direction of the forces/moments acting on the occupant's head. A neck compression force ($F_{NC}$) ads downward on the occupant's head and moves the head in a manner that compresses the neck vertebrae. A neck tension force ($F_{NT}$) pulls upward on the occupants head and moves the head in a manner that extends to the neck vertebrae. A neck flexion moment ($M_{NF}$) acts on the occupant's head in a manner that moves the head forward/downward from the perspective of the occupant, thereby bending the neck vertebrae forward from the perspective of the occupant. A neck extension moment ($M_{NE}$) acts on the occupant's head in a manner that moves the head rearward/upward from the perspective of the occupant, thereby bending the neck vertebrae rearward from the perspective of the occupant.

In the event that the inflatable curtain 14 is deployed and engages the OOP occupant 28, that occupant can undergo neck forces and moments in different combinations, resulting in different neck injury criteria scenarios. For example, the occupant 28 could experience neck compression force ($F_{NC}$) in combination with neck extension moment ($M_{NE}$), referred to herein as Neck Compression Extension ("NCE"). As another example, the occupant 28 could experience neck compression force ($F_{NC}$) in combination with neck flexion moment ($M_{NF}$), referred to herein as Neck Compression Flexion ("NCF"). As another example, the occupant 28 could experience neck tension force ($F_{NT}$) in combination with neck extension moment ($M_{NE}$), referred to herein as Neck Tension Extension ("NTE"). As a further example, the occupant 28 could experience neck tension force ($F_{NT}$) in combination with neck flexion moment ($M_{NF}$), referred to herein as Neck Tension Flexion ("NTF").

According to the present invention, the apparatus 10 is adapted to help reduce the neck injury criteria experienced by an OOP occupant, such as the occupant of FIGS. 3A and 3B. Referring to FIGS. 1A-1C, the apparatus 10 includes a deployment sleeve or sleeve 50 that inhibits the initial deployment of the inflatable curtain 14 in the area where the head of an OOP occupant is likely to be positioned at the time of deployment. The deployment sleeve 50 wraps around the deflated and stored curtain 14 (see FIG. 3B) along an axial portion of the curtain that coincides with the likely position of the OOP occupant's head. The deployment sleeve 50 leaves uncovered axial portions of the inflatable curtain 14 that do not coincide with the likely position of the OOP occupant's head. To this end, the deployment sleeve 50 can leave about half or more of the axial length of the inflatable curtain 14 uncovered and free to inflate and deploy without restriction.

Figure 2A:
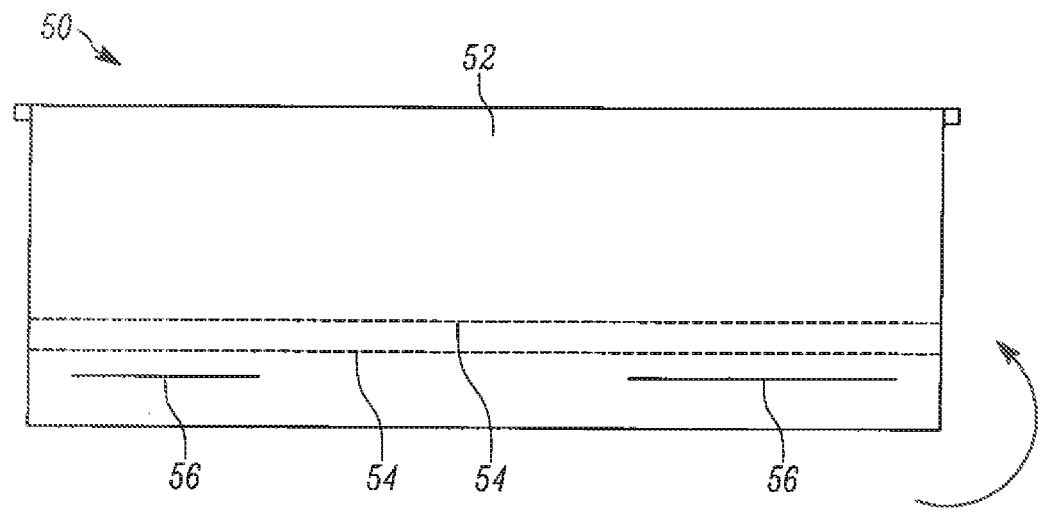
FIGS. 2A and 2B are plan views illustrating a portion of the apparatus of FIGS. 1A-1C.
Figure 2B:
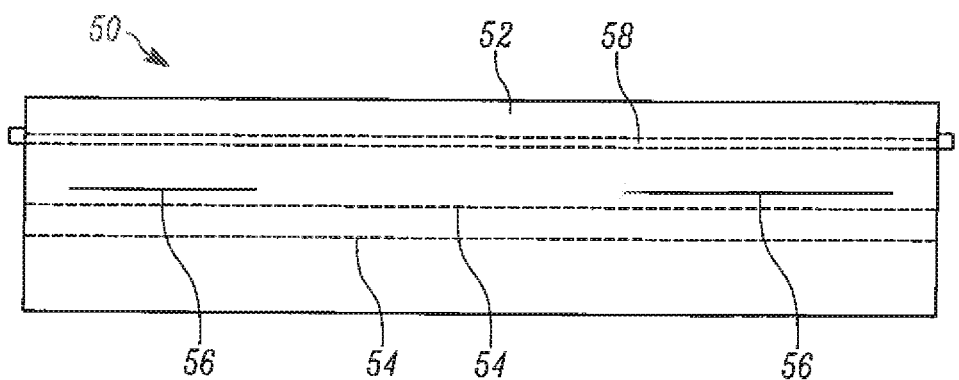

An example configuration of the deployment sleeve 50 is illustrated in FIGS. 2A and 2B. As shown in FIG. 2A, the deployment sleeve comprises a generally rectangular sheet 52 of material, such as air bag fabric or the fabric used to construct the air bag cover. The sheet 52 includes one or more longitudinal tear seams 54, such as perforations in the material, that extend along the length of the sleeve. The sheet 52 can also include one or more hardware slits 56 that permit passage of hardware, e.g., clamps or brackets, that are used to connect the air bag module to the vehicle. To construct the sleeve 50, the sheet 52 is wrapped as indicated generally by the curved arrow in FIG. 2A. Stitching 58 interconnects overlying longitudinal edges of the sheet 52 to complete the sleeve 50.

The deployment sleeve 50 can have a variety of alternative constructions. For example, the fear seam 54 can be formed by the stitching 58 that interconnects the folded over portions of the loop. In this instance, the yarn used to form the stitch can be sized so as to rupture in response to a force of a predetermined magnitude. Alternatively, the tear seam 54 can be formed by portions of the loop that are weakened in alternative manners, such as by scoring or puncture holes.

To assemble the air bag module, the deployment sleeve 50 can be fitted over the air bag 14 and fill tube 22 with the air bag being rolled or folded in the desired manner. Advantageously, the mounting hardware passing through the slits 56 can help maintain the deployment sleeve 50 at the desired longitudinal position along the length of the air bag 14/air bag module. The apparatus 10 can thus comprise an air bag module including the air bag 14, fill tube 22, inflator 24 and deployment sleeve 50 that can be mounted in the vehicle 12 as a unit.

Once the apparatus 10 actuated, the inflatable curtain 14 is required to reach the fully inflated and deployed condition within a short period of time, such as less than 30 milliseconds. Additionally, during the initial stages of deployment, the inflating curtain 14 needs to overcome the restrictive forces applied to it by structure such as any packaging sleeves or housings and any vehicle structure, such as the headliner and/or trim pieces behind which the curtain is stored. Because of this, the inflator 24 is sized to achieve an initial "break-out" force predetermined to overcome all of these restrictions so that the inflatable curtain 14 can reach the fully inflated and deployed condition within the required time. According to the present invention, the deployment sleeve 50 absorbs at least some of the this curtain break-out force in areas where the occupant's head is likely to be positioned in an OOP occupant scenario. The deployment sleeve 50 leaves areas where the occupant's head is not likely to be positioned in an OOP occupant scenario free to inflate and deploy unrestricted.

Regardless of whether an out-of-position occupant 28 is present in the vehicle seat 40, the deployment sleeve 50 inhibits deployment of the portion of the inflatable curtain 14 that it surrounds. Referring to FIGS. 1A-1C, in the case of a normally seated occupant 28, upon initial inflation and deployment, the deployment sleeve 50 inhibits, limits, restricts, or otherwise retards movement of the associated portion of the inflatable curtain 14 during the initial stages of curtain deployment. This is shown in FIG. 1B. The deployment restriction offered by the deployment sleeve 50 absorbs the forces associated with the initial inflation and deployment of the portion of the inflatable curtain 14 surrounded by the sleeve. At some predetermined point of inflation and deployment the tear seams 54 rupture, causing the deployment sleeve 50 to release the inflatable curtain 14 to continue deployment and reach the fully inflated and deployed condition of FIG. 1C.

Advantageously, in the case of the normally seated occupant (see FIGS. 1A-1C) the occupant 28 is positioned away from the vehicle side structure 16 and, therefore, the deployment delay caused by the deployment sleeve 50 does not impact the occupant protecting qualities of the inflatable curtain 14. This is because the time it takes for the normally seated occupant to move into contact with the inflatable curtain 14 is sufficient to allow the tear seams 54 to rupture, release the curtain, and permit the curtain to continue to the fully inflated and deployed condition.

Figure 4A:
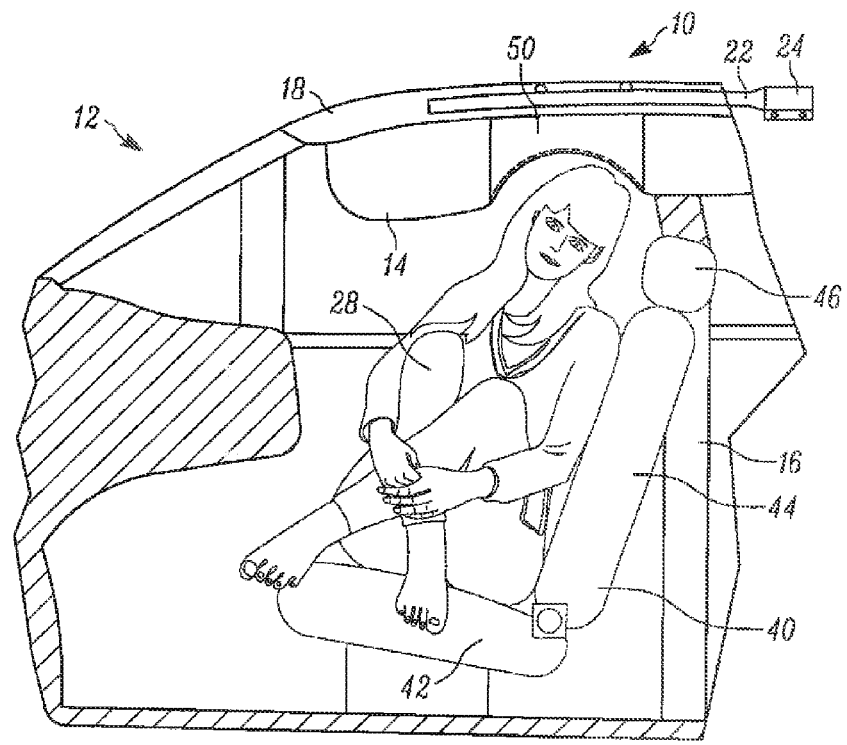
FIGS. 4A and 4B are schematic views illustrating the apparatus in different conditions in the vehicle of FIGS. 3A and 3B according to an embodiment of the invention.
Figure 4B:
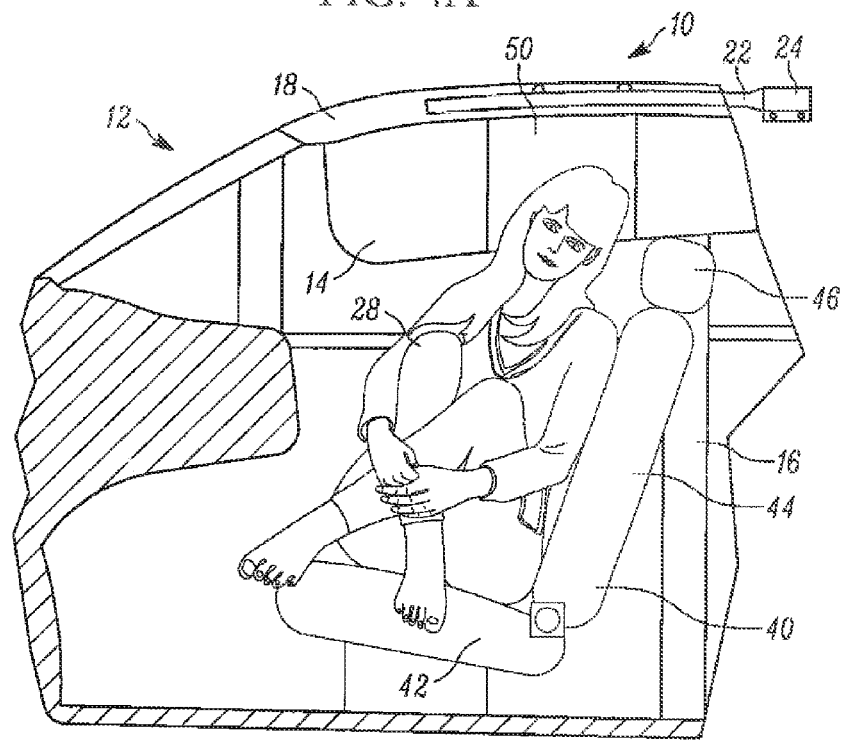

In the case of the OOP occupant (see FIGS. 4A-4B), the occupant 28 is positioned against or near vehicle side structure 16, so the deployment delay caused by the deployment sleeve 50 helps prevent the inflatable curtain 14 from impacting the occupant with full or unrestricted force, thus reducing the neck injury criteria associated with deployment of the inflatable curtain 14. This is important because the OOP occupant 28 can be positioned with his or her head in the deployment path of the inflatable curtain 14. Once the tear seams 54 rupture, the inflatable curtain 14 is released to continue to the fully inflated and deployed condition, positioned between the OOP occupant 28 and the vehicle side structure 16.

Those skilled in the art will appreciate that, regardless of the occupant position in the vehicle, the inflatable curtain 14 inflates and deploys within the amount of time necessary to afford the desired occupant protection. This is due at least in part to the fact that the deployment sleeve 50 only covers the axial portion(s) of the inflatable curtain 14 that coincide with the position of the occupant 28. This permits the portions of the curtain 14 not covered by the sleeve 50 to inflate and deploy in an unrestricted manner. Allowing these uncovered portions of the inflatable curtain 14 to get a "head start" on the restricted portions allows for inflation and deployment of the curtain as a whole to proceed even while the portion(s) covered by the sleeve(s) 50 are restrained temporarily. As a result, after the break-out forces are absorbed, the tear seams 54 rupture, and the sleeve(s) 50 release the curtain 14, the released portions of the curtain can inflate and deploy quickly because the remainder of the curtain has already undergone substantial inflation. The advantage of the present invention is therefore that the deployment sleeve 50 helps reduce the neck injury criteria in the event of an OOP occupant without compromising the performance of the inflatable curtain 14 as a whole.

Testing has showed that the deployment sleeve 50 is effective in mitigating the break-out force associated with the inflatable curtain 14. The performance of an inflatable curtain 14 was tested to demonstrate the effectiveness of the deployment sleeve 50. These tests showed that the maximum peak IAV (Injury Assessment Value) was reduced to 51% from 96% when the deployment sleeve 50 was included.

From the above description of the invention, those skilled in the art will perceive applications. Improvements, changes and modifications to the invention. For example, an apparatus including an inflatable curtain that covers occupants of front and rear seats (see, e.g., FIG. 5) could include multiple deployment sleeves, one being associated with each occupant position in the vehicle. Additionally, while the illustrated embodiments show the deployment sleeve being implemented in a curtain air bag, the sleeve could also be implemented in other side impact air bags configurations, such as a seat mounted side impact air bag. Such applications, improvements, changes and modifications within the skill of the art are intended to be covered by the appended claims.

Having described the invention, we claim the following:

1. An apparatus for helping to protect an occupant of a vehicle, comprising:
    an inflatable vehicle occupant protection device configured to be inflated and deployed between a side structure of the vehicle and the vehicle occupant; and
    a deployment sleeve configured and arranged to extend along and cover an axial portion of the protection device that coincides with a likely position of the occupant's head and to leave uncovered axial portions of the protection device that do not coincide with the likely position of the occupant's head, wherein the axial portion of the protection device covered by the deployment sleeve has a length sufficient to extend from forward of the occupant's head to rearward of the occupant's head, the deployment sleeve being configured to restrict and delay the initial deployment of the covered portion of the protection device a duration sufficient to absorb the initial break out forces of the covered portion and to protect an out-of-position occupant from being impacted with the full deployment force of the covered portion of the protection device, the deployment sleeve being further configured to rupture in time to permit the protection device to fully inflate and deploy in order to help protect a normally-seated occupant, the uncovered portions of the protection device being free to inflate and deploy without restriction.

2. The apparatus recited in claim 1, wherein the deployment sleeve comprises a tear seam adapted to rupture after the deployment sleeve absorbs the break-out forces and release the covered portion of the protection device to inflate and deploy to a fully inflated and deployed condition.

3. The apparatus recited in claim 1, wherein the uncovered portions of the protection device comprise portions of the protection device forward of and rearward of the covered portion.

4. The apparatus recited in claim 3, wherein the deployment sleeve is configured and arranged to permit the uncovered portions of the protection device to inflate and deploy ahead of the covered portion of the protection device.

5. The apparatus recited in claim 1, wherein the deployment sleeve further comprises a tear seam, and wherein the deployment sleeve is constructed and arranged so that the tear seam is maintained for a duration sufficient to absorb the initial break-out forces and thereby help protect the out of position vehicle occupant and also to rupture in time to permit the inflatable curtain to reach the fully inflated and deployed condition in time to help protect the normally-positioned vehicle occupant.

6. The apparatus recited in claim 1, further comprising an inflator and a fill tube having a portion disposed inside the protection device to deliver inflation fluid from the inflator to the protection device, wherein the inflator, fill tube, protection device, and deployment sleeve are assembled as a module that is configured for installation in the vehicle as a unit.

7. The apparatus recited in claim 1, wherein the protection device comprises a curtain air bag positioned adjacent to the intersection of the side structure and a roof of the vehicle.

8. The apparatus recited in claim 1, wherein the deployment sleeve comprises a fabric panel that is folded over and has overlying portions interconnected to form a loop.

9. The apparatus recited in claim 1, wherein the tear seam comprises one or more perforations in the fabric panel.

10. The apparatus recited in claim 1, wherein the out-of-position occupant being an otherwise normally-seated occupant leaned against the vehicle side structure with his or her head in the deployment path of the protection device.

11. The apparatus recited in claim 10, wherein the deployment sleeve is configured to cover the axial portion of the protection device that coincides with the likely position of the head of the out-of-position occupant.

12. The apparatus recited in claim 1, wherein the likely position of the occupant's head is forward from, and proximate to a headrest of the vehicle.

13. The apparatus of claim 1, wherein the deployment sleeve is a single deployment sleeve.

14. The apparatus of claim 1, wherein the deployment sleeve covers an axial length of the protection device that coincides with a region that extends from forward of the head of the normally-seated occupant to rearward of the head of the normally-seated occupant, the deployment sleeve being configured to protect the occupant in the event that the occupant is leaned out of position with his or her head positioned in the deployment path of the protection device.

15. The apparatus recited in claim 1, wherein the deployment sleeve protects the out-of-position occupant from being impacted with the full deployment force of the covered portion of the protection device by sufficiently delaying the deployment of the covered portion of the protection device to prevent the protection device from impacting the occupant with unrestricted force.

16. An apparatus for helping to protect an occupant of a vehicle, comprising:
    a curtain air bag configured to be inflated and deployed between a side structure of the vehicle and the vehicle occupant; and
    a deployment sleeve configured and arranged to extend along and cover an axial portion of the curtain air bag that coincides with a likely position of the head of an out-of-position occupant, wherein the axial portion of the curtain air bag covered by the deployment sleeve extends from forward of the occupant's head to rearward of the occupant's head, the deployment sleeve being constructed to inhibit and delay the deployment of the covered portion of the curtain air bag for a duration sufficient to absorb the initial break-out forces of the curtain air bag and thereby protect the out-of-position occupant from being impacted with the full initial break-out forces of the curtain air bag;
    wherein the out-of-position vehicle occupant is an occupant that is positioned with his or her head positioned in a deployment path of the curtain air bag.

17. The apparatus recited in claim 16, wherein the deployment sleeve includes a tear seam adapted to rupture after the deployment sleeve absorbs the break-out forces and release the curtain air bag to inflate and deploy to a fully inflated and deployed condition in time to help protect a normally-positioned vehicle occupant.

18. The apparatus according to claim 16, wherein the deployment sleeve is configured and arranged to leave uncovered axial portions of the curtain air bag that do not coincide with the likely position of the head of the out-of-position occupant, the uncovered portions of the curtain air bag being free to inflate and deploy prior to the covered portion and without delay.

19. The apparatus recited in claim 18, wherein the uncovered portions of the curtain air bag comprise portions of the curtain air bag forward of and rearward of the covered portion.

20. The apparatus recited in claim 16, further comprising an inflator and a fill tube having a portion disposed inside the curtain air bag to deliver inflation fluid from the inflator to the curtain air bag, wherein the inflator, fill tube, curtain air bag, and deployment sleeve are assembled as a module that is configured for installation in the vehicle as a unit.

21. The apparatus recited in claim 16, wherein the deployment sleeve comprises a fabric panel that is folded over and has overlying portions interconnected to form a loop, the fabric panel comprising at least one tear seam that is rupturable to release the covered portion of the curtain air bag to inflate and deploy.

22. The apparatus recited in claim 16, wherein the deployment sleeve protects the out-of-position occupant from being impacted with the full initial break-out forces of the curtain air bag by sufficiently delaying the deployment of the covered portion of the curtain air bag to prevent the curtain air bag from impacting the occupant with unrestricted force.

* * * * *